United States Patent Office 3,552,832
Patented Jan. 5, 1971

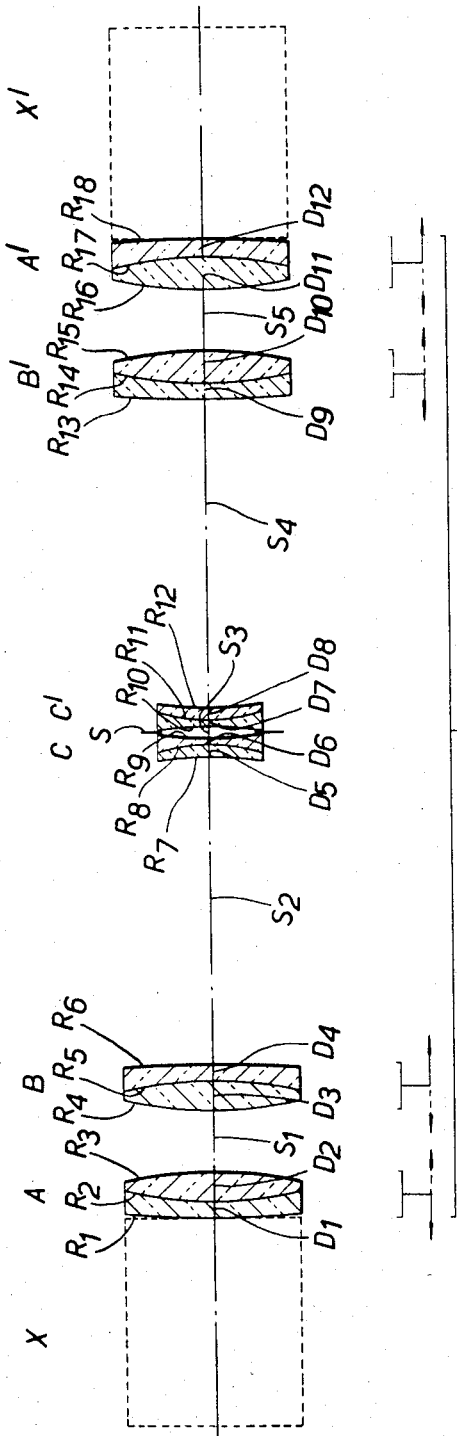

3,552,832
OPTICAL PROFILE PROJECTION SYSTEMS
David Demaine, Barnet, England, assignor to The Rank Organisation Limited, London, England, a company of Great Britain and Northern Ireland
Continuation-in-part of application Ser. No. 758,330, Sept. 9, 1968. This application Oct. 27, 1969, Ser. No. 869,803
Int. Cl. G02b 3/00, 9/00, 9/62
U.S. Cl. 350—212
6 Claims

ABSTRACT OF THE DISCLOSURE

An optical profile projector having an afocal optical objective providing telecentric projection, which comprises four components arranged in two pairs symmetrical with respect to a central diaphragm, the inner and outer components of the respective pairs being simultaneously and relatedly movable in such a manner as to maintain the symmetry of the arrangement, the laws of movement being such as to provide variation of the object plane/image plane distance whilst maintaining constant the overall magnification of the objective, the latter preferably being simultaneously subjected to an overall movement in order also to maintain constant the position of the image plane.

BACKGROUND OF THE INVENTION

This application is a continuation-in-part of my co-pending Application Ser. No. 758,330 filed Sept. 9, 1968 and now abandoned and, like the invention described in the specification of said co-pending application, the present invention relates to an optical measuring projector of the kind having an afocal optical objective providing telecentric projection.

Optical measuring projectors are used for projecting images of the profiles of engineering parts and the like on to a screen. The images may be accurately measured by means of templates attached to the screen, in which case the instrument is commonly referred to as a profile projector, or by means of micrometers traversed over the work so that the points to be measured coincide with fiducial marks on the screen. Such optical measuring projectors can provide a sharp and well-defined image of the profile of three dimensional objects. However, in order to ensure this, it has hitherto been necessary to provide for three dimensional movement of the object. Thus, the optical system of an optical measuring projector normally defines a fixed object plane and the object has to be moved, not only transversely with respect to the optical axis, but also along the optical axis, in order to bring into the object plane the successive portions of profile which are to be projected on to the screen. The movement of the object along the optical axis for focussing purposes is a source of difficulty, because it effectively creates the necessity of mounting the slides for transverse movements on a movable carriage, which is very disadvantageous from the point of view of achieving the high degree of precision required for the transverse movements. It would be much easier, particularly in the case where the object is either large or heavy, to provide for two dimensional movement of the object, more particularly only in the plane transverse to the optical axis.

OBJECT OF THE INVENTION

It is therefore an object of the invention to obviate partially or wholly the above-mentioned disadvantage which arises in conventional optical measuring projectors.

BRIEF SUMMARY OF THE INVENTION

According to the invention, in an optical measuring projector having an afocal optical objective providing telecentric projection, the objective comprises four convergent components arranged in two pairs which are symmetrical in construction and disposition with respect to a diaphragm located between the two pairs, the outer components of the respective pairs being simultaneously and equally movable in opposite directions with respect to the diaphragm in association with converse simultaneous and equal movements in opposite directions with respect to the diaphragm of the inner components, so as to vary the separation between the components of each pair and the separation between the pairs whilst maintaining the overall afocal condition and overall symmetry with respect to the diaphragm, the law of movement of the inner components being related to the law of movement of the outer components so as to provide variation of the object plane/image plane distance whilst maintaining constant the overall magnification of the objective.

Thus, in accordance with the invention, the above-mentioned object is achieved by providing an adjustable optical objective in the optical measuring projector. This objective fulfills four basic conditions:

(a) The maintenance at all times of unchanged magnification;

(b) The maintenance of the afocal condition necessary for telecentric projection;

(c) The provision of an object plane/image plane distance variable within a suitable range for movement of certain components of the objective in accordance with laws of movement which are mechanically practical; and (d) The maintenance of zero distortion.

The above-specified objective fulfills these conditions by using the first pair of components to produce an image in an infinitely distant image plane which defines an infinite object space for the second pair of components. Substantially zero distortion and unit magnification are maintained by the complete symmetry of construction and position with respect to the diaphragm, whilst the achievement of a practical range of adjustment of hte object plane/image plane distance is made possible by suitably relating the laws of movement of the particular components mentioned.

FURTHER FEATURES OF THE INVENTION

Adjustment of the objective results in change of the distance from the diaphragm of the objective to the image plane. Accordingly, whilst other solutions can be envisaged, in a preferred arrangement the complete objective including the diaphragm is subjected to an overall movement, related to the internal movements of its components, so as to maintain constant the position of the image plane during variation of the object plane/image plane distance.

The components of each pair are preferably symmetrical in construction with respect to the mid point between them, and each component of each pair may conveniently comprise a convergent element and a divergent element.

Furthermore, a pair of divergent components of major importance for the correction of field curvature and astigmatism are preferably located symmetrically adjacent opposite sides of the diaphragm and in fixed relationship thereto, between the two pairs of movable convergent components.

By suitable choice of optical powers for the individual components an arrangement is possible wherein the laws of movement of the inner and outer components are both substantially linear with respect to change in object plane/image plane distance. As the overall arrangement is symmetrical, the overall movement which is preferably imparted to the complete objective is also linearly related to the change in object plane/image plane distance. This means that all the necessary movements can be produced by means of a screw thread drive and simple linear levers operable by means of a single control element, possibly calibrated.

DESCRIPTION OF EMBODIMENT

A convenient practical example of objective in accordance with the invention is illustrated in the accompanying drawing.

Numerical data for this example are given in the following table, in which $R_1 R_2 \ldots$ represent the radii of curvature of the individual surfaces of the objective counting from the front (nearer the object), the positive sign indicating that the surface is convex to the front and the negative sign that it is concave thereto, $D_1 D_2 \ldots$ represent the axial thicknesses of the individual elements of the objective, and $S_1 S_2 \ldots$ represent the axial air separations between the components of the objective. The tables also give the mean refractive indices $n_d$ for the $d$-line of the spectrum and the Abbe V numbers of the materials of which the various elements are made, and in addition the clear diameters of the various elements of the objective. The second section of the table gives the values of the variable air separations for a portion of the range of adjustment in association with the change in object plane/image plane distance (Y) and with the change in diaphragm/image plane distance (Z) indicating the magnitude of the overall movement of the objective which takes place simultaneously with the internal movements of its individual components.

[Object Plane/Image Plane distance (Mean) = 47.700]

| Radius | Thickness or mean air separation | Mean refractive index $n_d$ | Abbe V number | Clear diameter |
|---|---|---|---|---|
| $R_1=+21.382$ | | | | |
| | $D_1=0.310$ | 1.75520 | 27.58 | 3.30 |
| $R_2=+7.153$ | | | | |
| | $D_2=0.559$ | 1.53315 | 57.98 | 3.30 |
| $R_3=-7.478$ | | | | |
| | $S_1=1.092$ | | (Variable) | |
| $R_4=+7.478$ | | | | |
| | $D_3=0.559$ | 1.53315 | 57.98 | 3.30 |
| $R_5=-7.153$ | | | | |
| | $D_4=0.310$ | 1.75520 | 27.58 | 3.30 |
| $R_6=-21.382$ | | | | |
| | $S_2=5.555$ | | (Variable) | |
| $R_7=-6.406$ | | | | |
| | $D_5=0.230$ | 1.75520 | 27.58 | 2.00 |
| $R_8=-3.229$ | | | | |
| | $D_6=0.130$ | 1.51680 | 64.17 | 2.00 |
| $R_9=+6.137$ | | | | |
| | $S_3=0.200$ | | | |
| $R_{10}=-6.137$ | | | | |
| | $D_7=0.130$ | 1.51680 | 64.17 | 2.00 |
| $R_{11}=+3.229$ | | | | |
| | $D_8=0.230$ | 1.75520 | | 2.00 |
| $R_{12}=+6.406$ | | | | |
| | $S_4=5.555$ | | (Variable) | |
| $R_{13}=+21.382$ | | | | |
| | $D_9=0.310$ | 1.75520 | 27.58 | 3.30 |
| $R_{14}=+7.153$ | | | | |
| | $D_{10}=0.539$ | 1.53315 | 57.98 | 3.30 |
| $R_{15}=-7.478$ | | | | |
| | $S_5=1.092$ | | (Variable) | |
| $R_{16}=+7.478$ | | | | |
| | $D_{11}=-0.559$ | 1.53315 | 57.98 | 3.30 |
| $R_{17}=-7.153$ | | | | |
| | $D_{12}=0.310$ | 1.75520 | 27.58 | 3.30 |
| $R_{18}=-21.382$ | | | | |

| Y | $S_1$ and $S_5$ | $S_2$ and $S_4$ | Z |
|---|---|---|---|
| 47.5096 | 2.3865 | 5.1982 | 23.7500 |
| 47.0001 | 2.1276 | 5.2696 | 23.5000 |
| 46.4933 | 1.8637 | 5.3410 | 23.2500 |
| 45.9992 | 1.6097 | 5.4124 | 23.0000 |
| 45.4878 | 1.3508 | 5.4839 | 22.7500 |
| 44.9691 | 1.0919 | 5.5553 | 22.5000 |
| 44.4931 | 0.8330 | 5.6267 | 22.2500 |
| 43.9998 | 0.5740 | 5.6982 | 22.0000 |
| 43.5092 | 0.3151 | 5.7697 | 21.7500 |
| 43.2648 | 0.1856 | 5.8053 | 21.6258 |
| 43.0212 | 0.0562 | 5.8410 | 21.5000 |

From the drawing, it will be seen that the optical objective in accordance with the invention for an optical measuring projector, comprises a pair of components A and B positioned on the optical axis on one side of a central diaphragm S and an identical pair of components $A^1$ and $B^1$ located on the optical axis on the other side of the diaphragm symmetrically with respect to the first pair. The two pairs of components afford an overall afocal condition to provide for telecentric projection at unit magnification, the first pair A and B producing an infinitely distant image serving as the object for the second pair $A^1$ and $B^1$. Each component of each pair comprises a divergent element and a convergent element, in particular a divergent meniscus element and a bi-convex convergent element, which may be cemented together or spaced by a narrow gap. The components are alternately arranged back to back, i.e. the bi-convex elements of components A and B and of components $A^1$ and $B^1$ face one another. Located between the above two pairs of components are a further pair of components C and $C^1$, each consisting of a convexo-concave element and a bi-concave element either cemented together or spaced by a narrow gap, the two comonents C and $C^1$ being arranged back to back close together symmetrically on opposite sides of the diaphragm S. The two components C and $C^1$ act as a compound member for correction of field curvature and astigmatism.

The above-described objective is corrected to allow for the presence of beam splitters, deviating prisms and protective windows for the objective, which are collectively indicated in the drawing by the glass blocks X and $X^1$, respectively immediately behind and in front of the front and rear components of the objective. At both front and rear of the objective specified in the first section of the table, the presence is assumed (and indicated in the drawing) of a plane faced block of axial length 3.800 made of a material of mean refractive index 1.51680 and Abbe V number 64.7, and of the same clear diameter as the front and rear components of the objective proper. Although the blocks form no part of the invention, it must be appreciated that an objective constructed in accordance with the tabulated data is accurately corrected to compensate for glass paths equivalent to those provided by the glass blocks in question.

As appears from the second section of the above table, the distance between the object and image planes can be altered by varying the separations between the components of the pairs A and B and $A^1$ and $B^1$ in a symmetrical manner. Thus, starting from a position at which the components A and B and $A^1$ and $B^1$ of each pair are nearly in contact, the distance between the object and image planes is a minimum. By moving the components A and $A^1$ (and their associated glass blocks) outwards and the components B and $B^1$ inwards in accordance with related laws of movement, the distance between the object and image planes is increased whilst maintaining the afocal condition of the objective and also maintaining unit magnification. At the same time the introduction of distortion is at all times avoided. The limit of movement is reached when the components B and $B^1$ reach the components C and $C^1$.

In more detail, with the particular construction of objective specified in the first section of the table, the components are moved according to the laws:

$$S_1 \text{ (and } S_5\text{)} = 22.2117 + 0.519Y$$

$$S_2 \text{ (and } S_4\text{)} = 11.9839 - 0.1429Y$$

where Y is the value of the object plane/image plane distance.

As can also be seen from the second section of the table, the adjustment of the objective gives rise to a change in the diaphragm/image plane distance. Accordingly, the complete objective is subjected to a movement related to the internal movements of its components so as to maintain constant the position of the image plane throughout the range of adjustment. With the particular construction specified in the table all the movements concerned are substantially linear and it is possible to use a simple screw thread drive and simple linear levers operated under the control of a single control element, which may be suitably calibrated.

In use in an optical measuring projector, it is only necessary to move the object transversely to the optical axis so as to bring a selected portion of the profile to be examined into the path of the illuminating rays. Thus, instead of moving the object to bring its profile portion into the object plane of the objective, the objective is adjusted by means of its control element, to bring its object plane into coincidence with the selected profile portion. The objective provides exactly the same image on the screen as would otherwise be seen by movement of the object along the optical axis in a conventional manner. Thus, with an opitcal measuring projector fitted with the above-described objective, it is possible to achieve the same accuracy of measurement as has hitherto been possible without the necessity for effecting difficult and precise movement of the object in an axial third coordinate direction. For the latter reason, and because it is relatively easy to achieve precision in the drives used in the adjustable objective, it will often be possible to achieve greater accuracy of measurement than has hitherto been possible. A further feature of the above-described objective which should be mentioned is that it provides a substantial clear working distance in front of the first lens, so that there is no risk of fouling between the object and the optical system.

I claim:

1. In an optical measuring projector, an afocal optical objective providing telecentric projection which is improved in that the objective comprises a diaphragm and four convergent components arranged in two pairs which are symmetrical in construction and disposition with respect to the diaphragm, which is located between the two pairs, the outer components of the respective pairs being simultaneously and equally movable in opposite directions with respect to the diaphragm in association with converse simultaneous and equal movements in oposite directions with respect to the diaphragm of the inner components, whereby to vary the separation between the components of each pair and the separation between the pairs whilst maintaining the overall afocal condition and overall symmetry with respect to the diaphragm, the law of movement of the inner components being related to the law of movement of the outer components to provide variation of the object plane/image plane distance whilst maintaining constant the overall magnification of the objective.

2. In an optical measuring projector, the combination with the objective according to claim 1 of means whereby the complete objective including the diaphragm is movable in toto in predetermined relationship to the internal movements of its components, so as to maintain constant the position of the image plane during variation of the object plane/image plane distance.

3. An optical objective according to claim 1, wherein the components of each pair are symmetrical in construction with respect to the midpoint between them.

4. An optical objective according to claim 3, wherein each component of each pair comprises a convergent element and a divergent element.

5. An optical objective according to claim 1, wherein a pair of divergent components for correction of field curvature and distoriton are located symmetrically adjacent opposite sides of the diaphragm and in fixed relationship thereto, between the two pairs of movable convergent components.

6. An optical profile projector according to claim 1, wherein the laws of movement of the inner and outer components are both substantially linear with respect to change in object plane/image plane distance.

References Cited

UNITED STATES PATENTS 2,256,102   9/1941   Reason.

DAVID SCHONBERG, Primary Examiner

P. A. SACHER, Assistant Examiner

U.S. Cl. X.R.

350—184, 210, 215, 228